United States Patent [19]

Poirier

[11] Patent Number: 5,411,281
[45] Date of Patent: May 2, 1995

[54] FIFTH WHEEL CONSTRUCTION HAVING ROTATABLE BEARING PLATE

[76] Inventor: Bertin Poirier, 7 rue Poirier, St. Blandine, Comte de Rimouski, Canada, G0K 1J0

[21] Appl. No.: 155,693

[22] Filed: Nov. 23, 1993

[51] Int. Cl.6 .............................................. B62D 53/08
[52] U.S. Cl. ................................. 280/433; 280/441.1; 384/421
[58] Field of Search ................... 280/433, 432, 441.1; 384/421

[56] References Cited

U.S. PATENT DOCUMENTS

| | | | |
|---|---|---|---|
| 2,662,799 | 12/1953 | Schaeffer | 384/421 |
| 2,665,177 | 1/1954 | Schaeffer | 384/421 |
| 3,887,251 | 6/1975 | McKay | 384/421 |
| 4,121,853 | 10/1978 | McKay | 280/433 |
| 5,066,035 | 11/1991 | Athans et al. | 280/433 |

*Primary Examiner*—Mitchell J. Hill
*Attorney, Agent, or Firm*—Eric Fincham

[57] ABSTRACT

A fifth wheel assembly for coupling a tractor to a trailer wherein the assembly includes a housing and a fixed plate which is secured to the trailer unit, and a king pin assembly having a body portion rotatably mounted within the housing, a plate member rotatably mounted with respect to the fixed plate, the king pin being secured to said body portion and plate member and being rotatable therewith. The ability of the king pin to rotate within the housing minimizes friction and reduces maintenance.

9 Claims, 4 Drawing Sheets

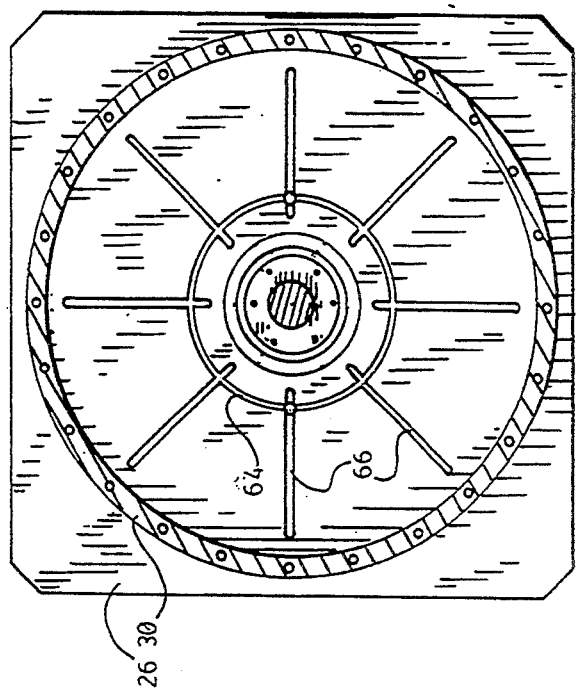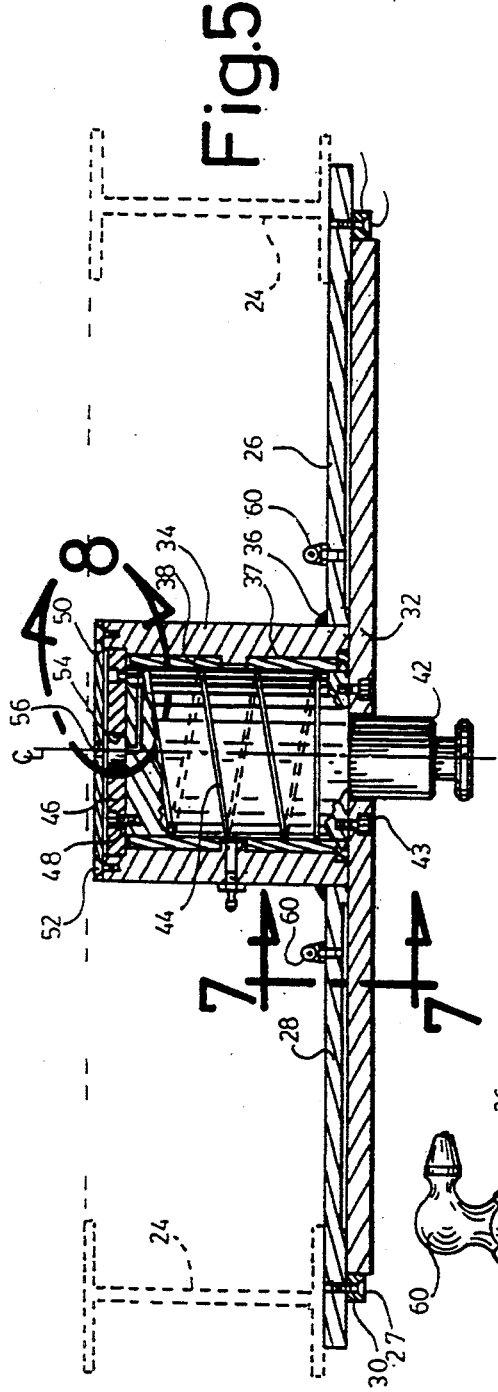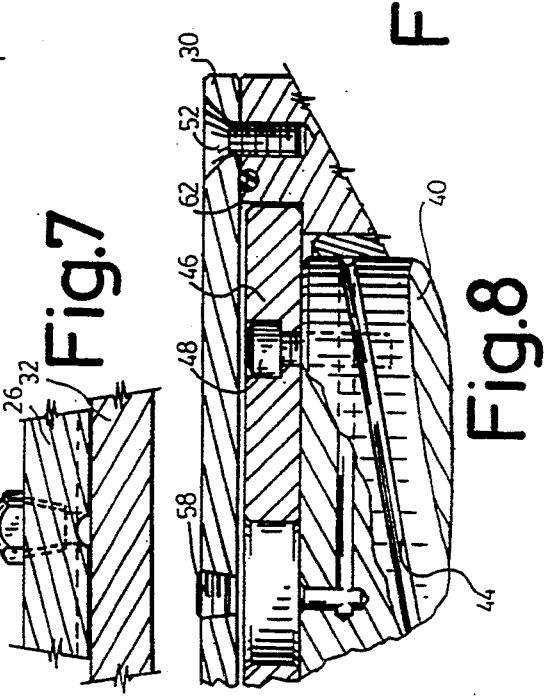

FIFTH WHEEL CONSTRUCTION HAVING ROTATABLE BEARING PLATE

BACKGROUND OF THE INVENTION

The present invention relates to a fifth wheel and more particularly, relates to a fifth wheel structure having a rotatable bearing plate.

As is well known in the art, tractor trailers use a coupling known as a fifth wheel wherein the trailer has one portion of the coupling and the truck or tractor unit has a further portion of the fifth wheel. Conventionally, the fifth wheel construction for the truck unit comprises a substantially round flat plate to form a tractor bearing surface. The semi trailer also includes a plate member with a king pin extending downwardly to locate and seat within a slot within the fifth wheel portion mounted on the truck unit. There are provided means for locking the kingpin in place when the truck is put into position with the two portions of the fifth wheel engaging together.

It is also well known in the art that friction between the two bearing surfaces develops and this can lead to many problems including driver fatigue, increased tire wear, poor handling, and structural problems associated with the units.

In order to minimize the above problems, it is also well known to place a lubricant between the two bearing surfaces. This lubricant, which is usually grease, helps but has not been found to be the solution since it is necessary to frequently replenish the grease and it is also dirty and messy. Moreover, the lubricant can be squeezed out of place and in cold weather, the lubricant can stiffen. This can again lead to handling and performance problems and cause dangerous vehicle handling characteristics.

In order to overcome the above problems, there have been proposals in the art to utilize substrates having a low co-efficient of friction. This solution does suffer, however, from the fact that dirt can enter these units and still lead to handling problems.

It has also been suggested that a rotating structure may be utilized in order to minimize the friction. While such structures have been proposed, generally they have not been practical as many have been relatively complex, expensive, heavy and difficult to maintain.

SUMMARY OF THE INVENTION

It is an object of the present invention to provide a fifth wheel structure wherein friction between the co-operative attaching means is reduced.

It is a further object of the present invention to provide a fifth wheel construction wherein the trailer unit has a rotating plate which is associated with a king pin which is also rotatable.

According to one aspect of the present invention, there is provided a fifth wheel assembly suitable for coupling a trailer unit to a tractor unit, the assembly comprising a non-rotatable housing and a non-rotatable plate, a king pin assembly comprising a king pin and a body member the body member being rotatably mounted within said housing, a rotatable disk member mounted adjacent said non-rotatable plate, the king pin being secured to the body member and being rotatable therewith.

The coupling assembly includes a conventional means on the truck unit and thus it is known in the art to have a horizontal tractor bearing plate which is mounted on the truck unit and is usually slightly rearwardly and downwardly angled to permit coupling of the tractor to the trailer. A slot is provided for receiving a king pin as will be discussed in greater detail hereinbelow.

The coupling assembly secured to the trailer portion includes a first portion which is fixedly secured to the trailer with a further portion being rotatable with respect to the first portion.

The first portion includes a non-rotatable plate and a non-rotatable housing. The plate and housing may be formed as a single unit or alternatively, may be formed as two separate units suitable secured together—e.g. by means of welding. The first portion is fixedly secured to the trailer unit and this may be done in a known manner through the use of various mechanical attachments.

The second portion of the assembly includes king pin assembly having a body member or portion which is rotatable within the housing along with a rotatable disk which is mounted in rotatable relationship to the plate, the king pin being secured to the body portion and disk and being rotatable therewith.

The disk, as above mentioned, is rotatable with respect to the fixed plate and to ensure a minimum of friction associated therewith, a slight gap may be provided between the plate and disk along with means for introducing a lubricant to this gap. Suitable means such as a grease fitting or the like may thus be utilized.

The body member or portion is rotatable within the housing and in a preferred embodiment, there is provided means for introducing a lubricant between the exterior of the body and the interior of the housing. As is the case with the disk rotating against the plate, there may also be provided means for introducing a lubricant between the body member and housing. Such means are known in the art and may include provisions for manually inserting a lubricant through a suitable cover member and/or the use of various fittings. Conveniently, for introducing the lubricant such that it will cover all contact surfaces, grooves or the like may be provided in one of the surfaces whereby the grooves provide a channel from the point of introduction of the lubricant across the entire surface.

The particular lubricant which is utilized may be selected from among those lubricants well known to those skilled in the art. Conventionally, a grease type of lubricant is utilized although other specialized lubricants can equally well be employed. Similarly, the materials of which the components are formed may be selected from among many suitable materials. For example, one may utilize certain plastics where lubricating is required to thus minimize the amount of lubricant required.

The assembly of the present invention eliminates many of the vehicle handling problems previously discussed. The use of the lubricant can substantially reduce some of the vibrations and the use of the rotatable king pin assembly also substantially eliminates a source of friction.

Having thus generally described the invention, reference will be made to the accompanying drawings illustrating an embodiment thereof, in which:

BRIEF DESCRIPTION OF THE DRAWINGS

FIG. 5 is a sectional view along the lines 5—5 of FIG. 3;

FIG. 6 is a bottom plan view of the fixed plate portion of the housing assembly;

FIG. 7 is a sectional view taken along the lines 7—7 of FIG. 5;

FIG. 8 is an expanded view of that portion of FIG. 5 indicated by arrow 8; and

DETAILED DESCRIPTION OF THE INVENTION

Figure 1:
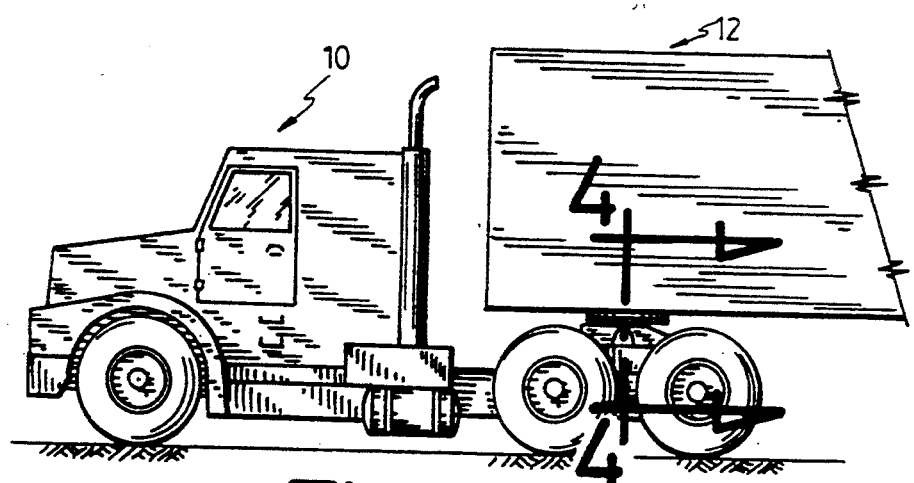
FIG. 1 is a side view of a tractor and trailer unit.
Figure 2:
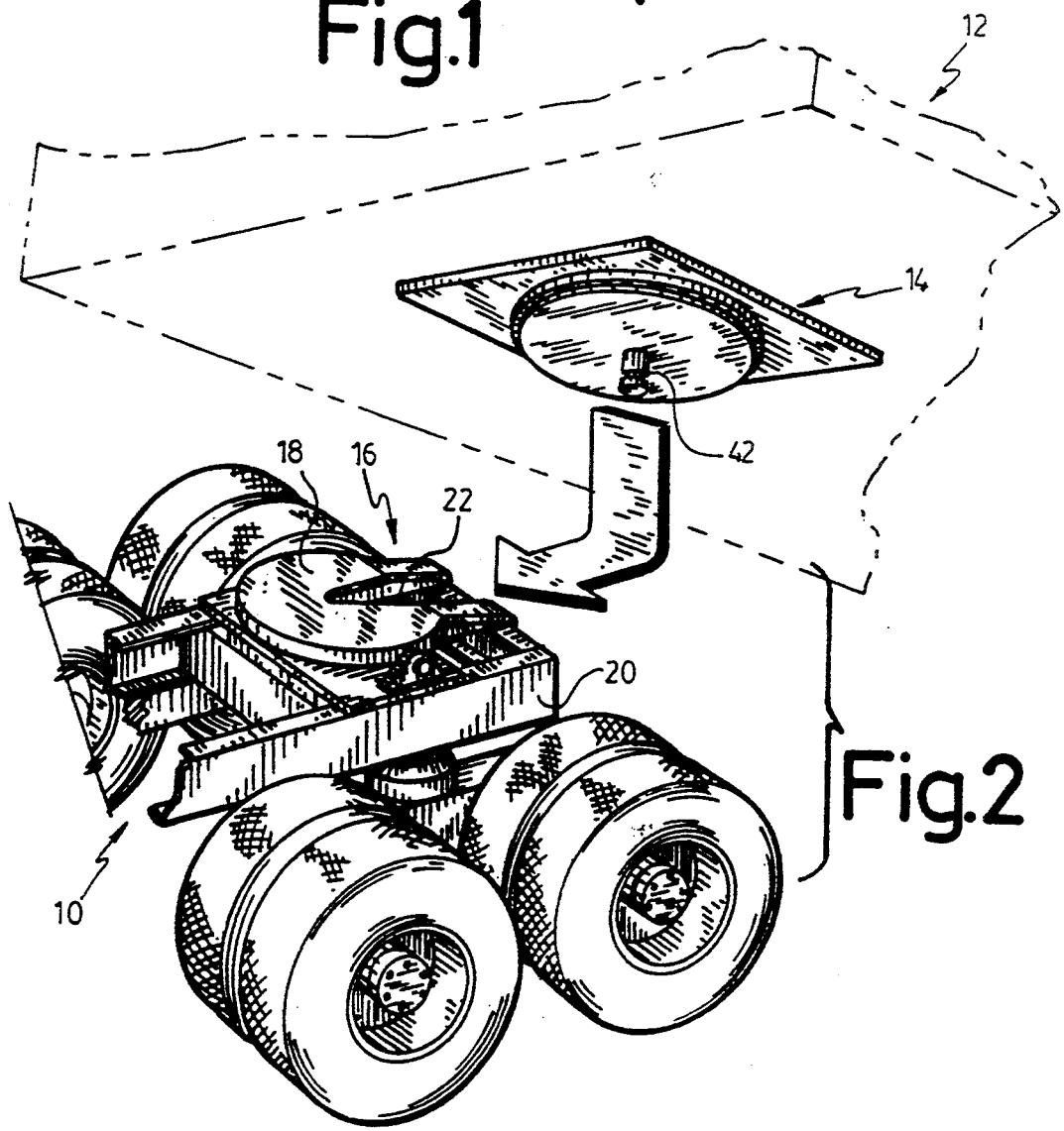
FIG. 2 is a perspective view illustrating the fifth wheel assembly for attachment of the trailer unit to the tractor unit.
Figure 3:
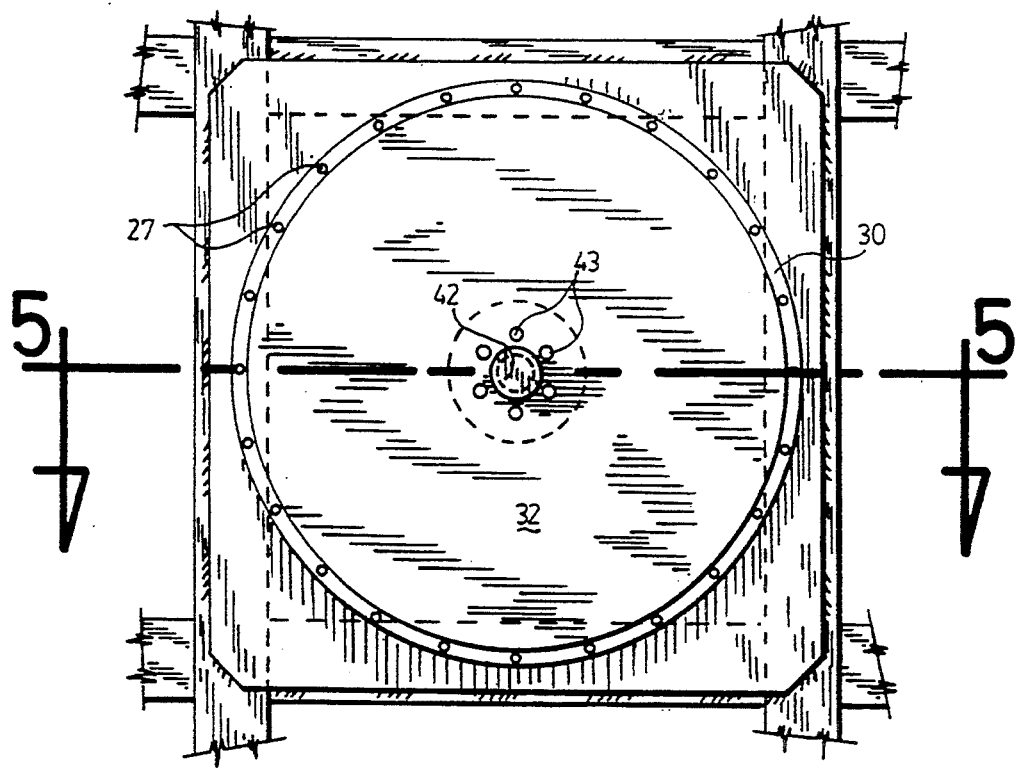
FIG. 3 is a bottom plan view of that portion of the fifth wheel assembly attached to the trailer unit.
Figure 4:
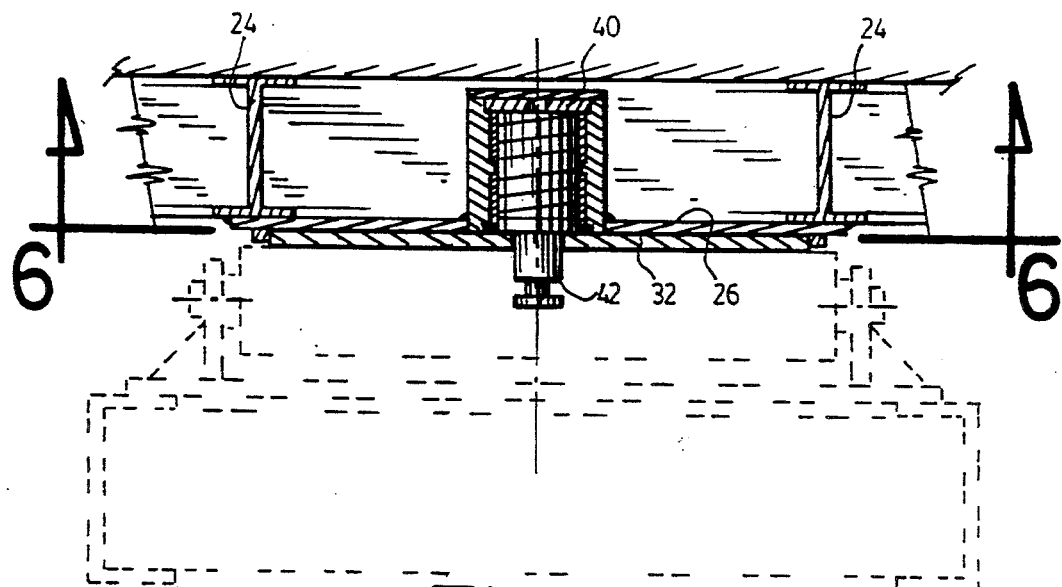
FIG. 4 is a sectional view along the lines 4—4 of FIG. 1.

Referring to the drawings in greater detail and by reference characters thereto, there is illustrated in FIGS. 1 and 2 a tractor or truck unit generally designated by reference numeral 10 and a trailer unit 12. The tractor and trailer units are attached together by means of a fifth wheel assembly which comprises a first portion 14 mounted on the underside of the trailer and a second portion 16 of the fifth wheel assembly being mounted on the tractor unit. Portion 16, mounted on tractor unit 10, is of a substantially conventional structure in that it includes a plate member 18 secured to a frame 20. Plate member 18 has a notch 22 formed therein and which is adapted to receive a king pin 42 as will be discussed in greater detail hereinbelow.

Portion 14 of the fifth wheel assembly for the trailer is illustrated in greater detail in FIGS. 3 to 8 and reference will now be made thereto. As may be seen, there is a fixed non rotatable plate 26 which is mounted to the frame (I-beams 24) of the trailer by suitable attachment means (bolts 27) which are secured through an outer flange 30.

Fixed plate 26, as may be seen from the cross sectional view of FIG. 5, has a centrally located circular recess generally indicated by reference numeral 28.

Portion 14 also includes a rotating disk 32 which is mounted adjacent the downwardly facing side of fixed plate 26 and fits interiorly of flange 30. Rotating disk 32 has a diameter which is slightly larger than the diameter of recess 28 to thereby provide a gap between plate 26 and disk 32 except for the outer extremity such that lubricant will be retained in the gap.

A non rotatable housing member 34 of a generally cylindrical configuration is joined by means of a weld 36 to non rotatable plate member 26. Members 26 and 34 together define the fixed portion of the assembly. Inside housing 34 are upper and lower sleeves 38 and 37 respectively. A king pin assembly comprising a body member or portion 40 is formed integrally with king pin 42 and is mounted within housing 34 and sleeves 38 and 37 as may best be seen in FIG. 5. Member 40, on the external surface thereof, has a spiral groove 44. As may be seen in FIG. 5, rotating disk 32 is secured to body member 40 by means of screws 43.

At the opposite end, a top plate 46 is secured to member 40 by means of screws 48. As shown in FIG. 8, top plate 46 sits within a recess formed within the wall of housing 34.

The housing also includes a cover member 50 secured to housing 34 by means of screws 52. An O-ring 62 is adapted to seat within a groove within the upper wall of housing 34 as seen in FIG. 8.

Top plate 46 has an aperture 54 formed therein as does cover 50 which has an aperture 56. A plug 58 is screw threadedly engaged within aperture 56. It will be noted that apertures 54 and 56 communicate with spiral groove 44 for purposes of supplying lubricant. A grease fitting 59 is provided within a side wall of housing 34 as a supplemental means of supplying lubricant to spiral groove 44.

As may be seen in FIG. 6, plate member 26 has an annular groove 64 with a plurality of radially extending grooves 66 extending therefrom. A plurality of grease fittings 60 are adapted to supply lubricant to grooves 64 from which it may spread to the recess 28 to minimize friction between rotating plate 32 and fixed plate 26.

Figure 9:
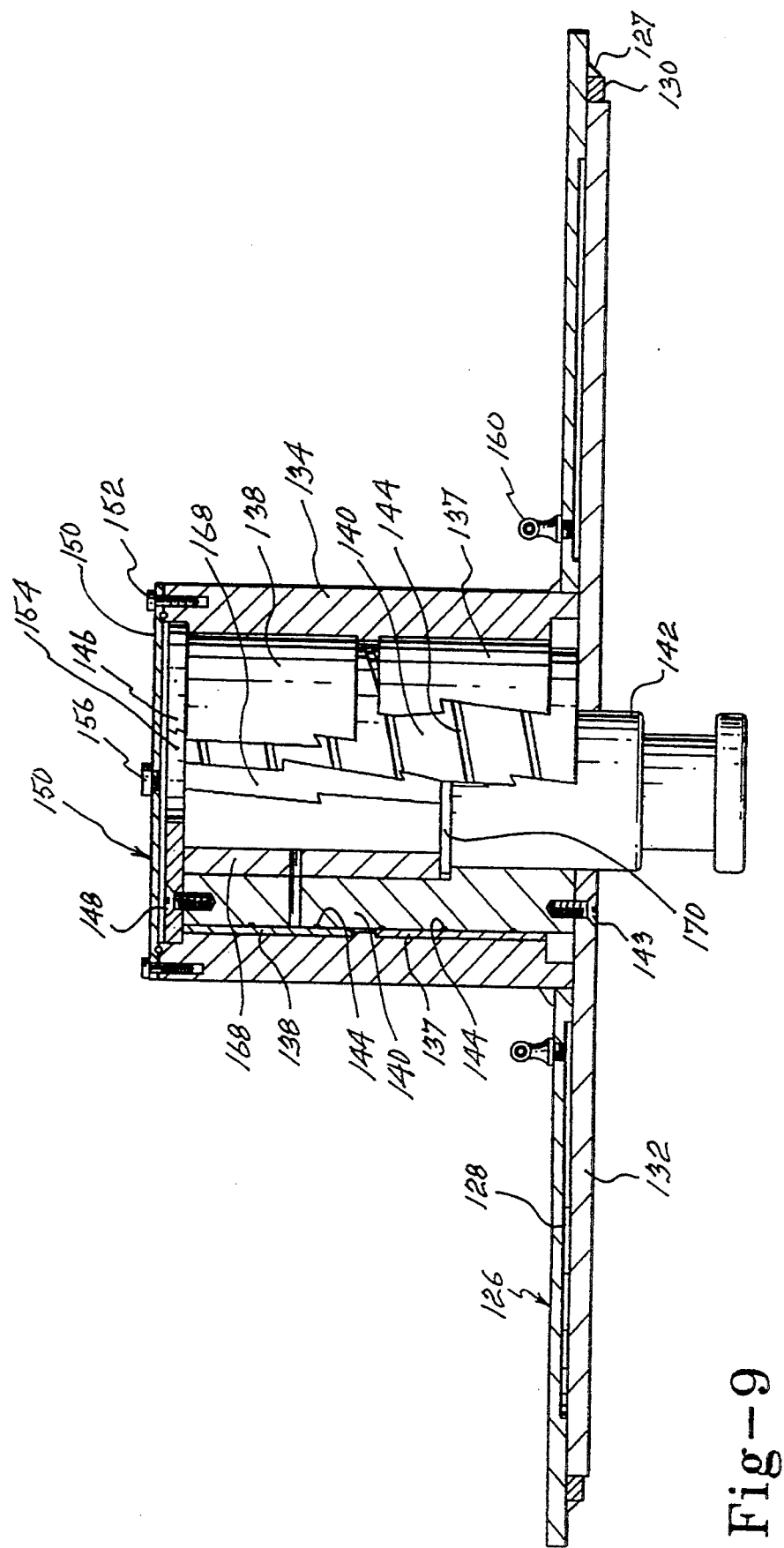
FIG. 9 is a view similar to FIG. 5 showing a modified embodiment thereof.

FIG. 9 illustrates a slightly modified embodiment wherein similar reference numerals in the hundreds have been used for similar components. In this embodiment, there is provided a fixed plate 126 and a rotating disk 132 which is mounted adjacent the downwardly facing side of fixed plate 126 and in its mounting arrangement, is similar to that previously described. Thus, there is provided a recess 128 for lubricant. It will be noted that flange 130 is secured to fixed plate 126 by means of a weld 127. Non-rotatable housing member 134 is secured to non-rotatable plate member 126. Inside housing 134 are upper and lower sleeves 138 and 137 respectively with body portion or member 140 being mounted therein. A king pin assembly includes member 140 and a separate king pin 142 is provided in this embodiment; king pin 142 which has a flange 170 and is mounted by means of a press fit within body member 140. A spacer sleeve 168 retains king pin 142 in the desired position. This arrangement provides for ease of removal of a worn king pin and the fitting of a new one within the assembly. The king pin, is thus maintained in position and will rotate with the body member 140.

As in the previous arrangement, body member 140 includes a spiral groove 144 for supplying lubrication. In this embodiment, the lubricant is supplied at the top and does not require the use of a supplemental grease fitting.

It will be understood that the above described embodiment is for purposes of illustration only and that changes and modifications may be made thereto without departing from the spirit and scope of the invention.

What is claimed is:

1. A fifth wheel assembly suitable for coupling a trailer unit to a tractor unit, said assembly comprising a non-rotatable housing and a non-rotatable plate adapted to be secured to said tractor unit, a king pin assembly comprising a king pin and a body portion, said body portion being rotatably mounted within said housing, and a rotatable disk mounted adjacent said non-rotatable plate.

2. The assembly of claim 1 wherein said housing is fixedly secured to said plate, said plate being mounted on said trailer unit.

3. The assembly of claim 1 further including at least one fitting to permit introduction of a lubricant between said rotatable disk and said non-rotatable plate.

4. The assembly of claim 1 further including at least one fitting to permit introduction of lubricant intermediate said body portion and said housing.

5. The assembly of claim 1 wherein said non-rotatable plate has a flange extending about a periphery thereof, said rotatable disk being mounted with an area defined by said flange and means for attaching said rotatable disk to said body portion.

6. The assembly of claim 1 wherein said rotatable disk is formed of a material having a low co-efficient of friction.

7. The assembly of claim 1 wherein said king pin and said body portion of said king pin assembly are formed as separate members, said king pin fitting within an aperture in said body portion and being retained therein.

8. The assembly of claim 1 wherein said body portion and said king pin are formed integrally, said rotatable disk being secured to said body portion whereby said king pin assembly and said rotatable disk rotate together.

9. In a tractor trailer unit joined by a fifth wheel assembly wherein the tractor unit has means for receiving a king pin to secure the trailer unit to the tractor unit, the improvement wherein said fifth wheel assembly comprises a non-rotatable plate and a non-rotatable housing secured to said trailer unit, the king pin assembly comprising a king pin and a body portion, said body portion being rotatably mounted within said housing such that said king pin and said body portion can rotate with respect to said housing, and a rotatable disk mounted adjacent said non-rotatable plate and being rotatable with respect thereto, said rotatable disk being secured to said king pin assembly.

* * * * *